United States Patent
Ma et al.

(10) Patent No.: US 12,081,872 B2
(45) Date of Patent: Sep. 3, 2024

(54) ANTI-SHAKE CAMERA AND TERMINAL

(71) Applicant: ZTE Corporation, Shenzhen (CN)

(72) Inventors: Jian Ma, Shenzhen (CN); Shoujun Cai, Shenzhen (CN); Xiaoyuan Zhou, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 66 days.

(21) Appl. No.: 18/009,010

(22) PCT Filed: May 7, 2021

(86) PCT No.: PCT/CN2021/092076
§ 371 (c)(1),
(2) Date: Dec. 8, 2022

(87) PCT Pub. No.: WO2021/258867
PCT Pub. Date: Dec. 30, 2021

(65) Prior Publication Data
US 2023/0217110 A1    Jul. 6, 2023

(30) Foreign Application Priority Data

Jun. 23, 2020   (CN) .......................... 202010580877.8

(51) Int. Cl.
*H04N 23/68*  (2023.01)
*H04N 23/51*  (2023.01)
*H04N 23/54*  (2023.01)

(52) U.S. Cl.
CPC .......... *H04N 23/687* (2023.01); *H04N 23/51* (2023.01); *H04N 23/54* (2023.01)

(58) Field of Classification Search
CPC .... H04N 23/687; H04N 23/685; H04N 23/57; H04N 23/55; H04N 23/54; H04N 23/51; H04N 23/50
See application file for complete search history.

(56) References Cited

U.S. PATENT DOCUMENTS 9,429,208 B2 * 8/2016 Cui ..................... F16C 32/0614
9,810,918 B2 * 11/2017 Minamisawa ........... G03B 5/06
(Continued)

FOREIGN PATENT DOCUMENTS

| CN | 104898347 A | 9/2015 |
| CN | 208707750 U | 4/2019 |

(Continued)

OTHER PUBLICATIONS

International Search Report for corresponding application PCT/CN2021/092076 filed May 7, 2021; Report dated Jul. 28, 2021.

*Primary Examiner* — Hung H Lam
(74) *Attorney, Agent, or Firm* — CANTOR COLBURN LLP

(57) ABSTRACT

An anti-shake camera includes a camera body, and a circuit board and a coil fixing plate which are fixed to a back surface of the camera body; a back surface of the coil fixing plate is divided into four areas according to diagonal lines, fan-shaped coils are respectively fixed to two symmetric areas among the four areas, and a rotating shaft is arranged in a center of the diagonal lines; and a substrate is arranged behind the back surface of the coil fixing plate, a surface, opposite to the back surface of the coil fixing plate, of the substrate is provided with a matching mechanism of the rotating shaft, and one or more fan-shaped permanent magnets forming gaps with included angles with the fan-shaped coils are fixed to areas, corresponding to areas of the coil fixing plate where no fan-shaped coils are fixed, on the substrate.

20 Claims, 4 Drawing Sheets

(56) References Cited

U.S. PATENT DOCUMENTS

| | | | |
|---|---|---|---|
| 11,467,369 B2 * | 10/2022 | Tseng | G03B 13/36 |
| 2002/0021423 A1 * | 2/2002 | Korenaga | G03F 7/70691 |
| | | | 355/53 |
| 2014/0160310 A1 * | 6/2014 | Lee | H04N 23/57 |
| | | | 348/208.7 |
| 2015/0201114 A1 * | 7/2015 | Shin | H04N 23/51 |
| | | | 348/375 |

FOREIGN PATENT DOCUMENTS

| | | |
|---|---|---|
| JP | 2011252989 A | 12/2011 |
| TW | 200903142 A | 1/2009 |

\* cited by examiner

ANTI-SHAKE CAMERA AND TERMINAL

CROSS-REFERENCE TO RELATED APPLICATION

The present disclosure is a National Stage Filing of the PCT International Application No. PCT/CN2021/092076 filed on May 7, 2021, which is based on and claims the benefit of priority of Chinese patent application No. "202010580877.8" filed on Jun. 23, 2020, the entirety of which is herein incorporated by reference.

TECHNICAL FIELD

The embodiments of the present disclosure relate to, but are not limited to, the field of device hardware, and particularly, relate to but are not limited to an anti-shake camera and a terminal.

BACKGROUND

With the increasing popularity of mobile terminals and smart devices with cameras, more and more people record moments of life by photographing and shooting videos in daily life and meanwhile put forward higher requirements for the quality of photos and videos. A mobile terminal performs photographing and video shooting commonly in a handhold manner, but it is difficult to keep the terminal in a stable state when the user is holding the terminal by hand since the hand is likely to shake, which causes the photos being vague and the videos being formed by shaky images, and as a result, user experience is influenced.

For the above problem, most of the cameras on the current mobile terminals have an anti-shake function. The current common anti-shake cameras prevent shake in an X-axis and a Y-axis, namely in a left-right direction and an up-down direction of a shooting plane. But when a user holds a mobile terminal for shooting, rotary shake, namely shake in a Z-axis direction is likely to happen due to reverse movement of two ends of the terminal on the shooting plane besides shake in the left-right direction and the up-down direction. For the problem about shake caused by rotation, there is still no proper solution yet.

SUMMARY

The embodiments of the present disclosure provide an anti-shake camera. The anti-shake camera includes a camera body, and a circuit board and a coil fixing plate which are fixed to a back surface of the camera body; a back surface of the coil fixing plate is divided into four areas according to diagonal lines, fan-shaped coils are respectively fixed to two symmetric areas among the four areas, and a rotating shaft is arranged in a center of the diagonal lines; a substrate is arranged behind the back surface of the coil fixing plate, a surface, opposite to the back surface of the coil fixing plate, of the substrate is provided with a matching mechanism of the rotating shaft, one or more fan-shaped permanent magnets are fixed to areas, corresponding to areas of the coil fixing plate where no fan-shaped coils are fixed, on the substrate, and gaps with included angles are formed between the one or more fan-shaped permanent magnets and the fan-shaped coils.

The embodiments of the present disclosure further provide a terminal. The terminal includes a terminal body with the above anti-shake camera.

DETAILED DESCRIPTION

Figure 1:
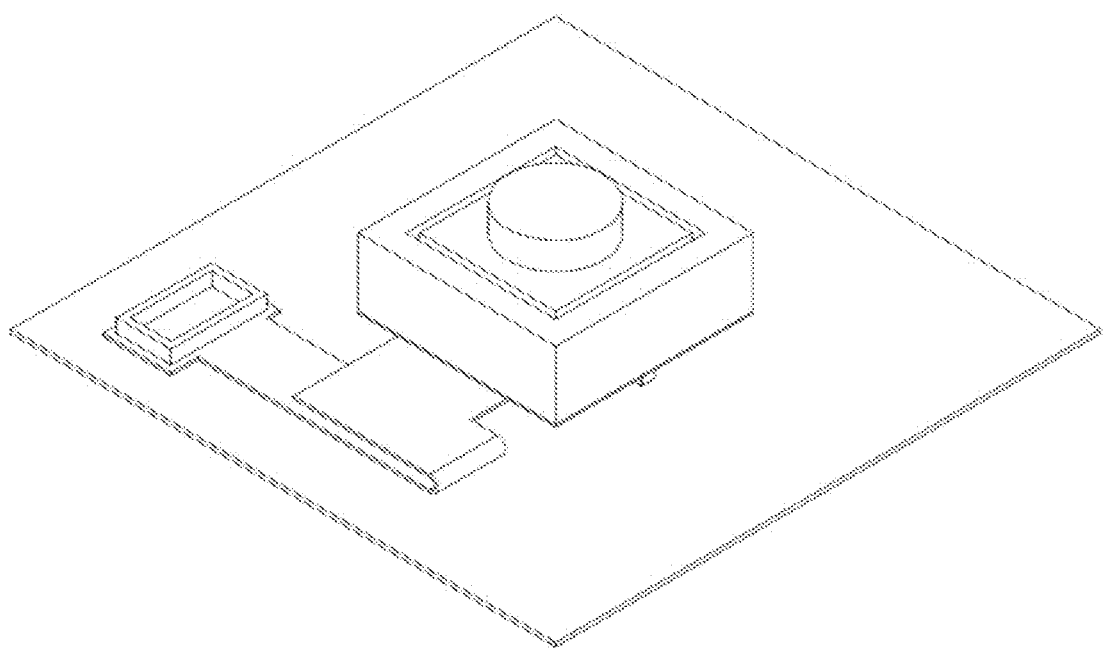
FIG. 1 is a perspective view of an anti-shake camera according to an embodiment of the present disclosure.

To make purposes, technical solutions and advantages of the present disclosure more clearly understood, the embodiments of the present disclosure are further described in detail by describing exemplary implementations with reference to drawings. It is to be understood that exemplary embodiments described herein are merely used for explaining the present disclosure rather than limit the present disclosure.

The embodiments of the present disclosure provide an anti-shake camera and a terminal and mainly solve, by providing the anti-shake camera, the technical problem concerning how to prevent shake in a Z-axis on a shooting plane.

The embodiments of the present disclosure are described in detail below, examples of the embodiments are shown in the drawings, and same or similar reference numerals are used throughout the description to represent same or similar components or components with same or similar functions. The following embodiments described with reference to the drawings are exemplary, and aim to explain the present disclosure instead of limiting the present disclosure.

In the description of the embodiments of the present disclosure, it is to be understood that orientation or position relationships indicated by terms "upper", "lower", "front", "rear", "left", "right", "vertical", "horizontal", "top", "bottom", "inner", "outer", etc. are shown based on the drawings. These terms are adopted not to indicate or imply that indicated devices or components have to be in specific orientations or structured and operated in specific orientations, but only to conveniently describe the embodiments of the present disclosure and simplify the description, and thus should not be understood as limits to the present disclosure.

In the embodiments of the present disclosure, the terms "install", "link", "connect", "fix" etc. should be generally understood unless specific regulations and limits are provided. For example, the scope of these terms includes fixed connection, detachable connection, or integrated connection; mechanical connection or electric connection; direct connection or indirect connection implemented through inter-media; internal communication between two components or interaction relationship between two components. Those having ordinary skill in the art can understand specific meanings of the above terms in the embodiments of the present disclosure according to specific situations.

To realize rotation control on the camera on the Z-axis and make the camera have an angle compensation function for Z-axis shake, the embodiment of the present disclosure provides an anti-shake camera. The anti-shake camera includes a camera body, and a circuit board and a coil fixing plate which are fixed to a back surface of the camera body. A back surface of the coil fixing plate is divided into four areas according to diagonal lines, fan-shaped coils are respectively fixed to two symmetric areas among the four areas, and a rotating shaft is arranged in a center of the diagonal lines. A substrate is arranged behind the back surface of the coil fixing plate, a surface, opposite to the back surface of the coil fixing plate, of the substrate is provided with a matching mechanism of the rotating shaft, one or more fan-shaped permanent magnets are fixed to areas, corresponding to areas of the coil fixing plate where no fan-shaped coils are fixed, on the substrate, and gaps with included angles (included angles of certain values) are formed between the one or more fan-shaped permanent magnets and the fan-shaped coils.

Figure 2:
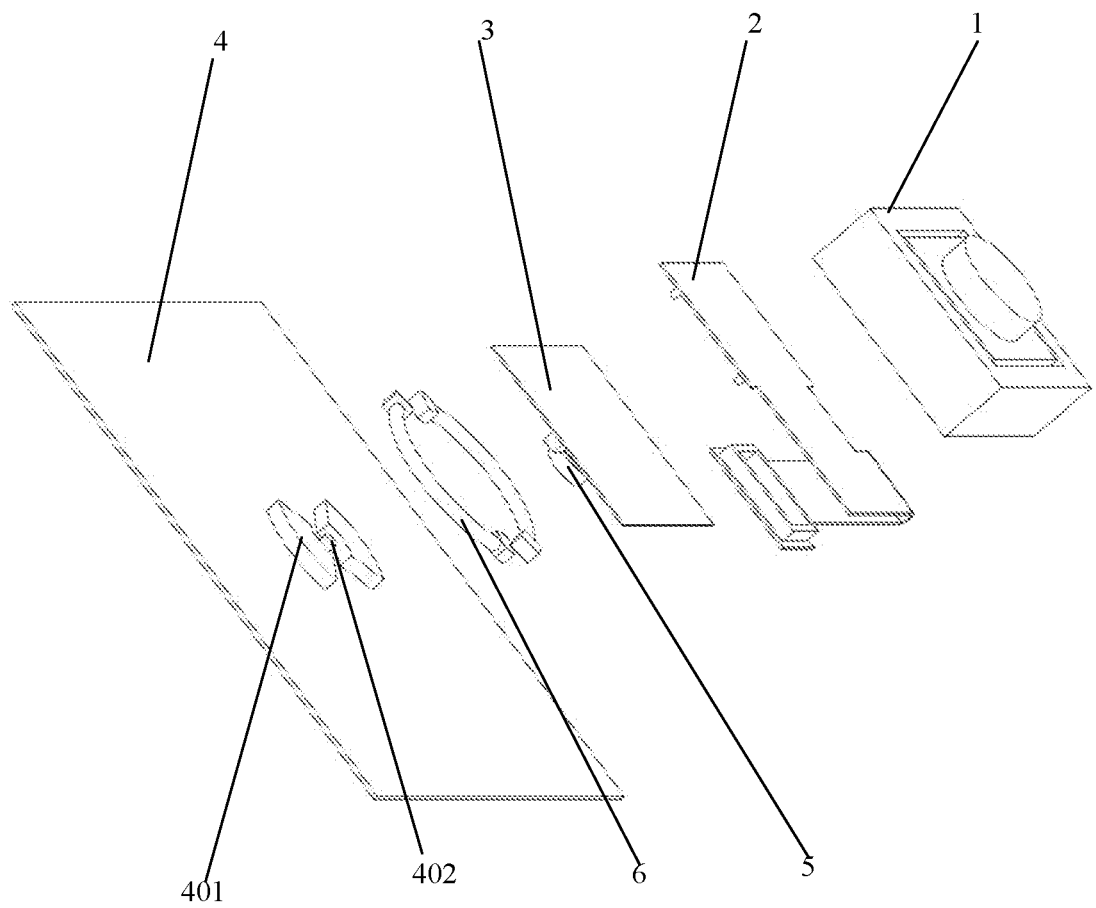
FIG. 2 is an exploded view 1 of the anti-shake camera according to an embodiment of the present disclosure.
Figure 3:
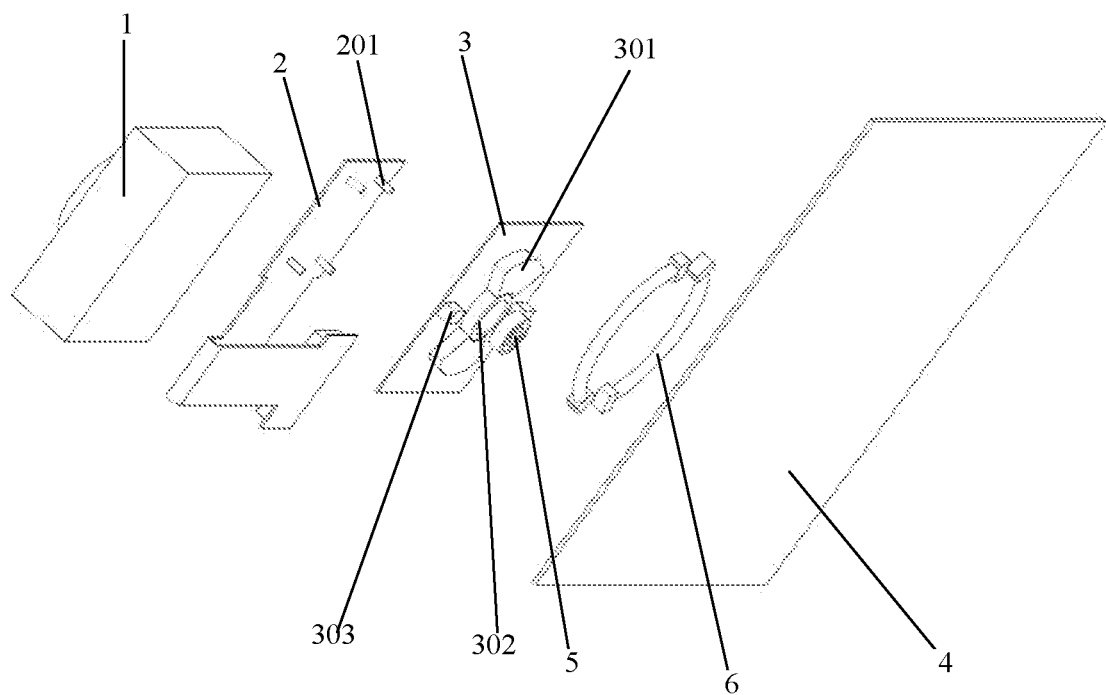
FIG. 3 is an exploded view 2 of the anti-shake camera according to an embodiment of the present disclosure.

Referring to FIG. 1, FIG. 2 and FIG. 3, FIG. 1 is a perspective view of an anti-shake camera according to an embodiment of the present disclosure. FIG. 2 is an exploded view 1 of an anti-shake camera according to an embodiment of the present disclosure. FIG. 3 is an exploded view 2 of an anti-shake camera according to an embodiment of the present disclosure.

The anti-shake camera includes a camera body 1, and a circuit board 2 and a coil fixing plate 3 which are fixed to a back surface of the camera body 1, and a substrate 4 is arranged below the coil fixing plate 3. The camera body 1, the circuit board 2 and the coil fixing plate 3 are fixed together, and the substrate 4 is movably connected to the coil fixing plate 3.

The camera body 1 is an imaging assembly of the camera, and mainly includes a protective casing. One or more lenses in the protective casing and Complementary Metal Oxide Semiconductors (CMOS) below the one or more lenses are connected to the circuit board 2 and a motherboard through a circuit. The circuit board 2 includes a data transmission circuit and a power supply circuit for the camera body 1 and fan-shaped coils 301 on the coil fixing plate 3. The coil fixing plate 3 is a main component for driving the circuit board 2 and the camera body 1 to rotate. A front surface of the coil fixing plate 3 is fixed to the circuit board 2, a back surface of the coil fixing plate 3 is divided into four areas according to diagonal lines, the fan-shaped coils 301 are respectively fixed to two symmetric areas among the four areas, and electrodes formed after the fan-shaped coil 301 are powered on are distributed at a left end and a right end of the corresponding fan-shaped area. The fan-shaped coils 301 are connected to the circuit board 2 through which power is supplied to the fan-shaped coils 301. A rotating shaft 302 is arranged at a center of the diagonal lines on the back surface of the coil fixing plate 3, and matched with a matching mechanism 402 on the substrate 4, thereby realizing rotation of the coil fixing plate 3 relative to the substrate 4. A center of the substrate 4 corresponds to a center of the coil fixing plate 3, and the matching mechanism 402 matched with the rotating shaft 302 on the coil fixing plate 3 is arranged at the center position to realize rotation. One or more fan-shaped permanent magnets 401 are fixed to areas, staggered from the fan-shaped coils 301 of the coil fixing plate 3, on the substrate 4, and magnetic poles of each fan-shaped permanent magnet 401 are distributed at a left end and a right end of a corresponding fan shape. Gaps with included angles (included angles of certain values) are formed between the one or more fan-shaped permanent magnets 401 and the left-end and right-end fan-shaped coils 301 after assembling, and the coil fixing plate 3 may rotate within the range of the included angles of the gaps, the larger the included angles of the gaps, the larger the rotating angles are, and the optional rotating angle range includes but not limited to +/−0 degree-20 degrees. After the anti-shake camera according to the embodiment of the present disclosure is assembled, an interval between the coil fixing plate 3 and the substrate 4 is greater than a thickness of the one or more fan-shaped permanent magnets 401, and is greater than a thickness of the fan-shaped coils 301.

In some embodiments, a reset spring is further arranged between a coil fixing plate and a substrate, one end of the reset spring is fixed to the coil fixing plate, and the other end of the reset spring is fixed to the substrate; and upon a condition that the coil fixing plate rotates relative to the substrate, the reset spring is compressed or stretched. A camera body is located at a fixed position upon a condition that fan-shaped coils are not powered on. Referring to FIG. 2 and FIG. 3, the reference numeral 6 represents the reset spring.

In some embodiments, the reset spring includes two arc springs, and two symmetric spring fixing points are arranged on the back surface of the coil fixing plate. The two arc springs are symmetrically arranged on outer sides of the fan-shaped coils and the fan-shaped permanent magnets, middle points of the two arc springs are respectively fixed to the corresponding spring fixing points, and two ends of each of the two arc springs are fixed to the substrate.

Referring to FIG. 3, the reset spring 6 includes two arc springs. Meanwhile, the back surface of the coil fixing plate 3 is further provided with spring fixing points 303 capable of fixing the arc springs. During assembling, two ends of each arc spring are fixed to the substrate 4, middle points of the arc springs are fixed to the spring fixing points 303. Accordingly, upon a condition that the coil fixing plate 3 rotates, each arc spring is compressed between the middle point and one end of the arc spring, and is stretched between the middle point and the other end of the arc spring; and upon a condition that the fan-shaped coils 301 are powered off, the camera returns to an initial position under the action of the arc springs.

In some embodiments, the coil fixing plate rotates relative to the substrate through a bearing. The rotating shaft is a bearing fixing barrel, and the matching mechanism is a bearing fixing column; or the rotating shaft is a bearing fixing column, and the matching mechanism is a bearing fixing barrel.

Referring to FIG. 2 and FIG. 3, upon a condition that the coil fixing plate 3 rotates relative to the substrate 4 through a bearing 5, the rotating shaft on the back surface of the coil fixing plate 3 is a bearing fixing barrel, and correspondingly, the matching mechanism on the substrate 4 is a bearing fixing column; alternatively, the rotating shaft is a bearing fixing column, and the matching mechanism is a bearing fixing barrel.

In some embodiments, a circuit board is a Flexible Printed Circuit (FPC). A front surface of the FPC is connected to a circuit of the camera body, and a back surface of the FPC is connected to the fan-shaped coils via through holes in the coil fixing plate.

Figure 4:
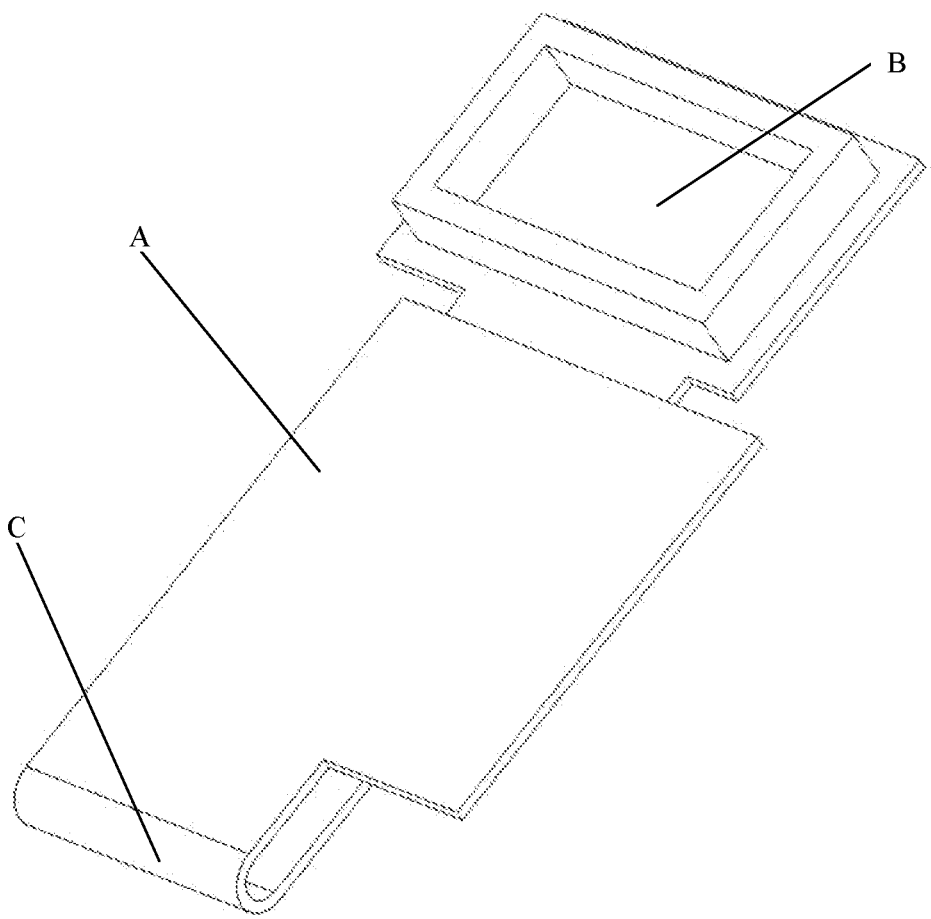
FIG. 4 is a schematic diagram of a circuit board of the anti-shake camera according to an embodiment of the present disclosure.

Referring to FIG. 2, FIG. 3 and FIG. 4, the FPC has the characteristics of being thin and good in flexibility and serves as the circuit board in a camera, which can reduce the integral thickness of a camera module. Data transmission and power supply of the entire camera module are usually realized by the FPC, thus, the front surface of the FPC is connected to the circuit of the camera body 1 to supply power to the camera body 1 and meanwhile transmit data generated by the camera body 1 in time. Since power is supplied to the fan-shaped coils 301 arranged on the back surface of the coil fixing plate 3 by the FPC, corresponding through holes are directly formed in the coil fixing plate 3 to facilitate connection between the fan-shaped coils 301 and the FPC, and the back surface of the FPC is directly connected to the fan-shaped coils 301 through the through holes. Referring to FIG. 3, coil connecting columns 201 are arranged on the back surface of the FPC and penetrate through the through holes in the coil fixing plate 3 to be connected to the fan-shaped coils 301. Referring to FIG. 1, one end of the FPC is usually directly packaged and fixed to the entire anti-shake camera module, and the other end of the FPC is connected to a corresponding port of the motherboard in a port manner.

In some embodiments, a circuit, extending out of a camera body, of an FPC is in a right angle form, and the other end of the right angle is reversely folded; and upon a condition that the coil fixing plate rotates, a folding point of the FPC moves along with the rotation of the coil fixing plate.

Referring to FIG. 4, FIG. 4 is a schematic diagram of a circuit board of an anti-shake camera according to an embodiment of the present disclosure. The part, extending out of the camera body, of the PFC is integrally in the right angle form, where the area A is a front surface of the part, extending out of the camera body, of the FPC, the area B is a port in the other end of the FPC and may be directly connected to the motherboard, and the area C is a reverse folding area. The circuit will not be damaged by reverse folding since the FPC is made of flexible materials. The folding area C follows rotation of the coil fixing plate through front-back movement in the rotating process of the coil fixing plate, thereby preventing the circuit board from interfering with rotation of the coil fixing plate.

In some embodiments, the fan-shaped permanent magnet is arranged in any area in the areas, corresponding to the areas of the coil fixing plate where no fan-shaped coils are fixed, on the substrate, or the fan-shaped permanent magnets are arranged in two areas, corresponding to the areas of the coil fixing plate where no fan-shaped coils are fixed, on the substrate. FIG. 2 is a schematic diagram of arranging the fan-shaped permanent magnets in two areas. In some embodiments, the fan-shaped permanent magnet may be arranged only in one area so as to further reduce a weight of the entire anti-shake camera module.

In some embodiments, the camera body is a zoom camera which is able to prevent shake in an X-axis and a Y-axis. After Z-axis shake prevention is realized, the anti-shake capability of the camera is further enhanced by setting X-axis shake prevention and Y-axis shake prevention on the camera body.

In some embodiments, the camera body, the circuit board, the coil fixing plate and the substrate are packaged on an anti-roll frame, and rotating spaces for the camera body, the circuit board and the coil fixing plate are reserved in the anti-roll frame. To reduce a fault rate of the camera and meanwhile improve installation convenience, the camera body, the circuit board, the coil fixing plate and the substrate may be packaged on one anti-roll frame, and meanwhile corresponding movement spaces need to be reserved in the anti-roll frame.

The embodiments of the present disclosure provide an anti-shake camera. The anti-shake camera includes a camera body, and a circuit board and a coil fixing plate which are fixed to a back surface of the camera body; a back surface of the fixing plate is divided into four areas according to diagonal lines, fan-shaped coils are respectively fixed to two symmetric areas among the four areas, and a rotating shaft is arranged in a center of the diagonal lines; and a substrate is arranged behind the back surface of the fixing plate, a surface, opposite to the back surface of the fixing plate, of the substrate is provided with a matching mechanism of the rotating shaft, one or more fan-shaped permanent magnets are fixed to the areas, corresponding to areas of the coil fixing plate where no fan-shaped coils are fixed, on the substrate, and the gaps with included angles are formed between the one or more fan-shaped permanent magnets and the fan-shaped coils. The coil fixing plate, the camera body fixed by the coil fixing plate, and the substrate are enabled to rotate through the rotating shaft and the matching mechanism between the coil fixing plate and the substrate, and a rotation angle is controlled by a Micro Control Unit (MCU) through the fan-shaped coils and the permanent magnets.

The embodiment of the present disclosure provides a terminal. The terminal includes a terminal body with the anti-shake camera according to the embodiments of the present disclosure.

The anti-shake camera according to the embodiments of the present disclosure may serve as a camera component to be integrated in the terminal, or may also serve as an independent camera shooting module to be externally hung on the exterior of the terminal body.

The above contents further describe the embodiments of the present disclosure in detail by combining the exemplary implementations, but it cannot be considered that the implementations of the present disclosure are only limited to these explanations. Those having ordinary skill in the technical field of the present disclosure may make some simple deductions or substitutions without departing from the concept of the present invention, which should fall within the scope of protection defined by the appended set of claims of the present disclosure.

What is claimed is:

1. An anti-shake camera, comprising a camera body, and a circuit board and a coil fixing plate which are fixed to a back surface of the camera body, wherein
   a back surface of the coil fixing plate is divided into four areas according to diagonal lines, fan-shaped coils are respectively fixed to two symmetric areas among the four areas, and a rotating shaft is arranged in a center of the diagonal lines; and
   a substrate is arranged behind the back surface of the coil fixing plate, a surface, opposite to the back surface of the coil fixing plate, of the substrate is provided with a matching mechanism of the rotating shaft, one or more fan-shaped permanent magnets are fixed to areas, corresponding to areas of the coil fixing plate where no fan-shaped coils are fixed, on the substrate, and gaps with included angles are formed between the one or more fan-shaped permanent magnets and the fan-shaped coils.

2. The anti-shake camera according to claim 1, wherein a reset spring is further arranged between the coil fixing plate and the substrate, one end of the reset spring is fixed to the coil fixing plate, and the other end of the reset spring is fixed to the substrate; and upon a condition that the coil fixing plate rotates relative to the substrate, the reset spring is compressed or stretched.

3. The anti-shake camera according to claim 2, wherein the reset spring comprises two arc springs, and two symmetric spring fixing points are arranged on the back surface of the coil fixing plate; and
   the two arc springs are symmetrically arranged on outer sides of the fan-shaped coils and the fan-shaped permanent magnets, middle points of the two arc springs are respectively fixed to the corresponding spring fixing points, and two ends of each of the two arc springs are fixed to the substrate.

4. The anti-shake camera according to claim 3, wherein upon a condition that the coil fixing plate rotates, each arc spring is compressed between the middle point and one end of the arc spring, and is stretched between the middle point and the other end of the arc spring.

5. The anti-shake camera according to claim 4, wherein upon a condition that the fan-shaped coils are powered off, the camera body returns to an initial position under action of the two arc springs.

6. A terminal, comprising a terminal body with the anti-shake camera according to claim 2.

7. A terminal, comprising a terminal body with the anti-shake camera according to claim 3.

8. The anti-shake camera according to claim 1, wherein the coil fixing plate rotates relative to the substrate through a bearing;
the rotating shaft is a bearing fixing barrel, and the matching mechanism is a bearing fixing column;
or
the rotating shaft is a bearing fixing column, and the matching mechanism is a bearing fixing barrel.

9. The anti-shake camera according to claim 1, wherein the circuit board is a Flexible Printed Circuit (FPC), a front surface of the FPC is connected to a circuit of the camera body, and a back surface of the FPC is connected to the fan-shaped coils via through holes in the coil fixing plate.

10. The anti-shake camera according to claim 9, wherein a circuit, extending out of the camera body, of the FPC is in a right angle form, and the other end of the right angle is reversely folded; and
upon a condition that the coil fixing plate rotates, a folding point of the FPC moves along with the rotation of the coil fixing plate.

11. The anti-shake camera according to claim 9, wherein coil connecting columns are arranged on the back surface of the FPC and penetrate through the through holes in the coil fixing plate to be connected to the fan-shaped coils.

12. The anti-shake camera according to claim 1, wherein the fan-shaped permanent magnet is arranged in any area in the areas, corresponding to the areas of the coil fixing plate where no fan-shaped coils are fixed, on the substrate;
or
the fan-shaped permanent magnets are arranged in two areas, corresponding to the areas of the coil fixing plate where no fan-shaped coils are fixed, on the substrate.

13. The anti-shake camera according to claim 1, wherein the camera body is a zoom camera which is able to prevent shake in an X-axis and a Y-axis.

14. The anti-shake camera according to claim 1, wherein the camera body, the circuit board, the coil fixing plate and the substrate are packaged on an anti-roll frame, and rotating spaces for the camera body, the circuit board and the coil fixing plate are reserved in the anti-roll frame.

15. A terminal, comprising a terminal body with the anti-shake camera according to claim 1.

16. The terminal according to claim 15, wherein the anti-shake camera is a camera component to be integrated in the terminal, or is an independent camera shooting module to be externally hung on an exterior of the terminal body of the terminal.

17. The anti-shake camera according to claim 1, wherein the substrate is movably connected to the coil fixing plate.

18. The anti-shake camera according to claim 1, wherein the circuit board comprises a data transmission circuit and a power supply circuit for the camera body.

19. The anti-shake camera according to claim 1, wherein an interval between the coil fixing plate and the substrate is greater than a thickness of the one or more fan-shaped permanent magnets, and is greater than a thickness of the fan-shaped coils.

20. The anti-shake camera according to claim 1, wherein the coil fixing plate, the camera body fixed by the coil fixing plate, and the substrate are enabled to rotate through the rotating shaft and the matching mechanism between the coil fixing plate and the substrate, and a rotation angle is controlled by a Micro Control Unit (MCU) through the fan-shaped coils and the one or more fan-shaped permanent magnets.

* * * * *